United States Patent
Madsen et al.

(10) Patent No.: US 7,457,712 B1
(45) Date of Patent: Nov. 25, 2008

(54) DISTRIBUTED TEST EQUIPMENT SYSTEM FOR TESTING ANALOG COMMUNICATIONS SYSTEMS

(75) Inventors: Benny Madsen, Los Altos, CA (US); Christian Olgaard, Sunnyvale, CA (US); Carsten Andersen, Sunnyvale, CA (US); Gary Wang, Milpitas, CA (US); Thomas Andersen, Pleasanton, CA (US); Peter Petersen, Concord, CA (US)

(73) Assignee: LitePoint Corp., Sunnyvale, CA (US)

( * ) Notice: Subject to any disclaimer, the term of this patent is extended or adjusted under 35 U.S.C. 154(b) by 982 days.

(21) Appl. No.: 10/770,298

(22) Filed: Feb. 2, 2004

(51) Int. Cl.
*G06F 19/00* (2006.01)
(52) U.S. Cl. .................. 702/77; 702/183
(58) Field of Classification Search ............. 370/352; 702/77
See application file for complete search history.

(56) References Cited

U.S. PATENT DOCUMENTS

| | | | | |
|---|---|---|---|---|
| 6,243,738 B1* | 6/2001 | Hayles et al. | ............... | 709/203 |
| 6,505,137 B1* | 1/2003 | Evans et al. | ................ | 702/119 |
| 2003/0004680 A1* | 1/2003 | Dara-Abrams et al. | ...... | 702/183 |
| 2003/0125890 A1* | 7/2003 | Nagamatsu | .................. | 702/77 |
| 2004/0151168 A1* | 8/2004 | Phillips et al. | ............. | 370/359 |
| 2004/0254757 A1* | 12/2004 | Vitale et al. | ................. | 702/122 |

* cited by examiner

*Primary Examiner*—Creighton H Smith
(74) *Attorney, Agent, or Firm*—Vedder Price P.C.

(57) ABSTRACT

A distributed test equipment system for testing analog communications systems. One or more analog signal receivers and one or more computers are connected via a packet-switched network such that each computer can remotely control and receive signal data from each receiver. Analog signal data measured by each receiver is available for relaying to each computer where it is processed for analysis in conformance with respective user commands.

16 Claims, 4 Drawing Sheets

DISTRIBUTED TEST EQUIPMENT SYSTEM FOR TESTING ANALOG COMMUNICATIONS SYSTEMS

BACKGROUND OF THE INVENTION

1. Field of the Invention

The present invention relates to test equipment and systems for communications systems, and in particular, to test equipment for testing analog communication systems using remote control and processing of test data.

2. Description of the Related Art

As test equipment for communication systems has become more sophisticated, increasing amounts of processing power are included within the test unit. This has become more common as the systems being tested become increasingly complex. For example, it is increasingly common for the virtual equivalent of a computer, such as a personal computer, to exist within the test equipment, thereby allowing it to run many of the more complex operating systems, such as Windows by Microsoft Corporation. For many users, this increases the utility of the equipment since the user is generally familiar with the user interfaces made possible by such operating systems. It also allows the user to install third party software as well as writing his own software targeted to the particular application for which the test equipment is being used.

While this approach can make the test equipment powerful when used as a stand-alone unit, it becomes quite difficult to provide significant and fast interaction with more than one user, particularly when the user is trying to access the test equipment remotely, e.g., via a network of some kind. Since such test equipment not only measures the various signal parameters, but also processes the data to compute various characteristics of the signal, the interface between the test equipment and remote user becomes quite complex. Hence, the sophistication and processing power which is advantageous for stand alone testing becomes an impediment for accessing control by a remote user as well as multiple users.

SUMMARY OF THE INVENTION

In accordance with the presently claimed invention, a distributed test equipment system for testing analog communications systems includes one or more analog signal receivers and one or more computers connected via a packet-switched network such that each computer can remotely control and receive signal data from each receiver. Analog signal data measured by each receiver is available for relaying to each computer where it is processed for analysis in conformance with respective user commands.

In accordance with one embodiment of the presently claimed invention, an apparatus including a distributed test equipment system for testing analog communications systems includes a packet-switched network interface, an analog signal receiver, a server and a client computer. The packet-switched network interface includes a server connection node and a client connection node for relaying a plurality of packetized test commands and a plurality of packetized signal data. The analog signal receiver is responsive to an analog signal received from an external signal source by measuring the analog signal and generating a plurality of measurement data representing the analog signal. The server is coupled to the server connection node and the analog signal receiver, and is responsive to the plurality of packetized test commands by packetizing and transmitting, via the server connection node, the plurality of measurement data as the plurality of packetized signal data. The client computer, including a user interface, is coupled to the client connection node, responsive to a plurality of user commands received via the user interface by generating and transmitting the plurality of packetized test commands, and is further responsive to the plurality of user commands and the plurality of measurement data by processing the plurality of measurement data to produce a plurality of processed signal data representing a plurality of characteristics of the analog signal.

In accordance with another embodiment of the presently claimed invention, an apparatus including a distributed test equipment system for testing analog communications systems includes packet-switched network means, analog signal receiver means, server means and client computer means. The packet-switched network means is for relaying a plurality of packetized test commands and a plurality of packetized signal data. The analog signal receiver means is for measuring an analog signal received from an external signal source and generating a plurality of measurement data representing the analog signal. The server means is for receiving the plurality of packetized test commands and in response thereto packetizing and transmitting the plurality of measurement data as the plurality of packetized signal data. The client computer means is for receiving a plurality of user commands via a user interface and in response thereto generating and transmitting the plurality of packetized test commands, and processing the plurality of measurement data to produce a plurality of processed signal data representing a plurality of characteristics of the analog signal.

In accordance with another embodiment of the presently claimed invention, a method for testing analog communications systems in a distributed testing environment includes:

receiving a plurality of user commands via a computer user interface;

generating a plurality of packetized test commands in response to the plurality of user commands;

relaying the plurality of packetized test commands via a packet-switched network;

receiving an analog signal from an external signal source;

measuring the analog signal and generating a plurality of measurement data representing the analog signal;

packetizing the plurality of measurement data as a plurality of packetized signal data in response to the plurality of packetized test commands;

relaying the plurality of packetized signal data via the packet-switched network; and processing the plurality of measurement data in response to the plurality of user commands to produce a plurality of processed signal data representing a plurality of characteristics of the analog signal.

DETAILED DESCRIPTION OF THE INVENTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

Figure 1:
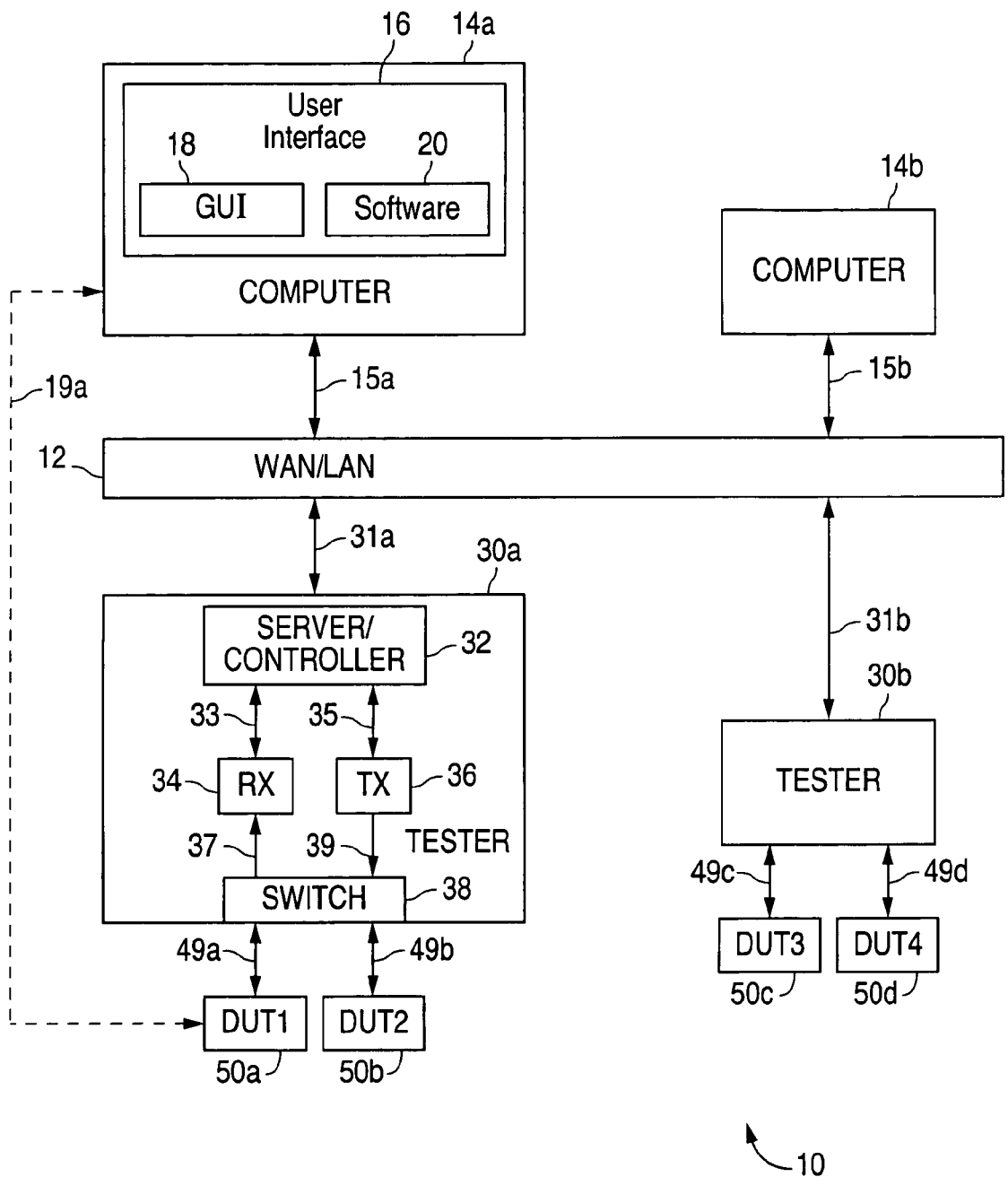
FIG. 1 is a functional block diagram of a distributed test equipment system in accordance with one embodiment of the presently claimed invention.

Referring to FIG. 1, a distributed test equipment system 10 for testing analog communications systems in accordance with the presently claimed invention includes, as its primary components, a signal test, or capture, unit 30 and a post-processing unit 14, interconnected via a standard packet-switched network 12, e.g., a Transmission Control Protocol-Internet Protocol (TCP/IP) network, such as an Ethernet or Fast Ethernet network. Accordingly, the user interface is removed from the test equipment itself and now resides in the computer, e.g., a standard personal computer (PC), and communicate via the standard network. As a result, it is now possible to move virtually all of the processing from the test equipment to the PC, thereby enabling the user to update the system over time to acquire more processing power and enable the test system to support more features by simply upgrading software within the PC.

Further, by separating the tester 30 and the user interface 16, including the final processing, new user scenarios become enabled. For example, multiple users can share a single tester 30 and test setup by simply logging into the tester 30, performing their measurement on the setup, and then processing the data within their respective PC 14. Alternatively, one PC 14a can be used to control multiple testers 30, such as in the case of a production line where one PC can process data from one tester while one or more testers acquire further data. As a still further alternative, as discussed in more detail below, in a highly integrated tester, various portions of the tester can be available for control individually by separate computers and users. For example, one PC 14a could control a test setup that performs tests using the transmitter portion 36 of the tester 30, while another PC 14b can control a test setup using the receiver portion 34. (One example of such an integrated tester is described in commonly assigned, co-pending U.S. patent application Ser. No. 10/770,020, filed on even date herewith and entitled, "Integrated Radio Frequency (RF) Tester", the disclosure of which is incorporated herein by reference.)

Referring again to FIG. 1, a distributed test equipment system 10 in accordance with various embodiments of the presently claimed invention includes one or more analog signal testers 30a, 30b and one or more computers 14a, 14b, all communicating via a packet-switched network 12, often referred to as a wide area network (WAN) in the case of the Internet or a local area network (LAN) which may be in the form of a network residing behind a router or firewall for connection to the Internet. Each tester 30 can be connected to one or more devices under test (DUT) 50 for providing various signals for transmission to the DUT 50 or receiving various signals from the DUT 50. (A tester for use in accordance with the presently claimed invention has been implemented for purposes of testing RF transceivers intended for use according to the IEEE 802.11 standard, using the frequencies of 2.4-2.485 gigahertz and 4.9-5.85 gigahertz. However, it will be understood by one of ordinary skill in the art that other types transceivers can also be used and controlled in a distributed test equipment system as discussed herein.)

The tester 30 includes a receiver section 34 and a transmitter section 36, both of which can be interfaced with one or more external connections 49a, 49b via a switch network 38 in accordance with well known techniques. A server/controller 32 controls the receiver 34 and transmitter 36 and provides an interface 31a to the network 12. The computer 14 includes a user interface 16 through which the user controls the computer 14 and tester 30 which is being accessed. Such user interface 16 includes a graphic user interface 18 and software 20, as well as inputs for user devices such as a keyboard or mouse (not shown). An independent interface 19a may also be provided between the computer 14a and DUT 50a for certain specific direct control of the DUT 50a by the computer 14a or reporting of specific test conditions by the DUT 50a to the computer 14a in accordance with well known techniques (e.g., via hard wired connection, wireless connection, etc.).

One good example of the network 12 would be that of a TCP/IP network such that the server/controller 32 of the tester 30 will have its own Internet protocol (IP) address, as will the computer 14a being used to control the specific tester 30a. Communication between these devices 32, 14a is in accordance with well known packet-switch networking techniques.

As noted above, a second computer 14b, also with its own IP address, can also be part of the network and connected to the same tester 30a for sharing the resources of the tester 30a being controlled with the first computer 14a. Further, the server/controller 32 can provide separate controls and interface capabilities for the receiver 34 and transmitter 36 such that while one computer 14a is controlling and accessing the receiver 34, the other computer 14b can be controlling and accessing the transmitter 36. Such control and access might be in the form of one computer 14a accessing measured signal data from the receiver 34 for processing by the computer 14a, while the other computer 14b accesses and controls the transmitter 36 by providing specific signal data to be transmitted to a DUT 50b.

Figure 2:
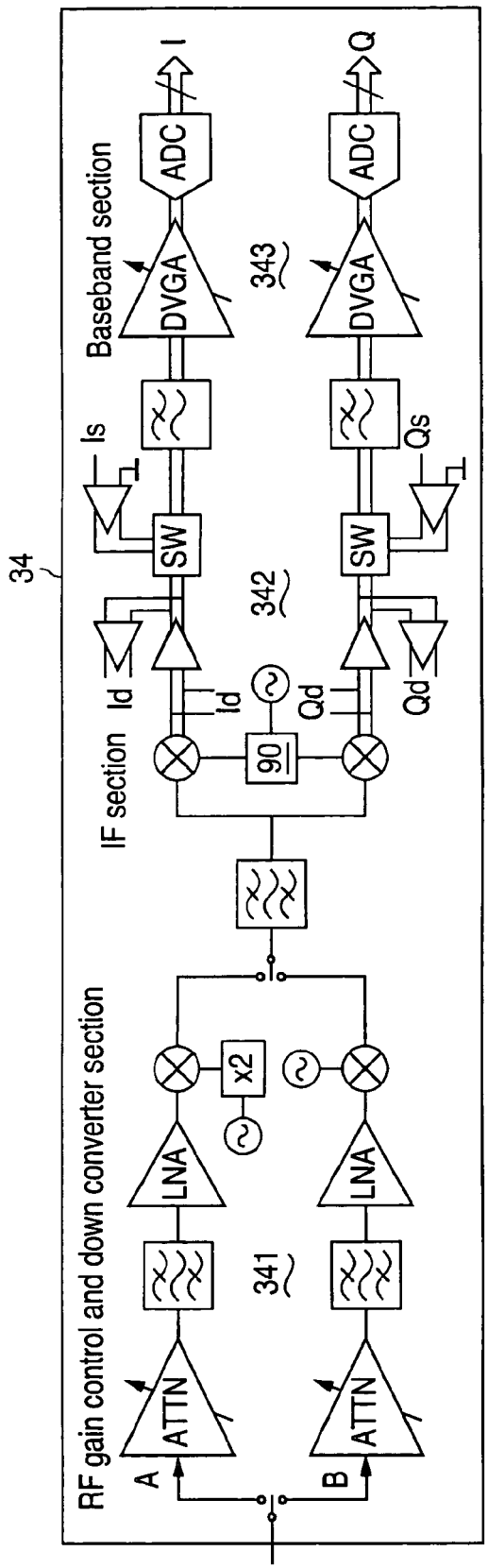
FIG. 2 is a functional block diagram of an example of the receiver section of the tester of FIG. 1.

Referring to FIG. 2, one example of a receiver 34 includes a frequency down converter section 341, an intermediate frequency (IF) section 342 and a baseband section 343. In the input section 341, the incoming signal is attenuated and amplified in a gain controlled manner, filtered in a bandpass manner and down converted in frequency in accordance with well known techniques to produce an IF signal. In the IF section 342, this IF signal is demodulated, e.g., quadrature demodulated, and filtered in a low pass manner to produce one or more baseband signals. In the baseband section 343, these baseband signals are attenuated or amplified as necessary and converted from analog to digital signals.

Figure 3:
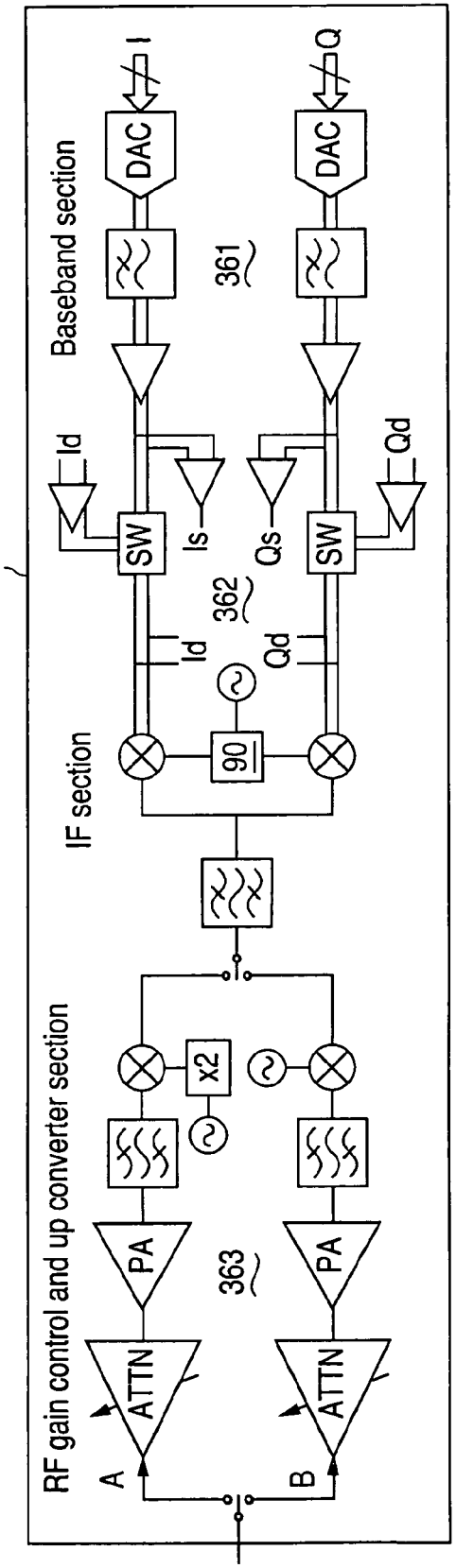
FIG. 3 is a functional block diagram of an example of the transmitter section of the tester of FIG. 1.

Referring to FIG. 3, one example of a transmitter 36 for use in the tester 30 includes a baseband section 361, an IF section 362 and a frequency up-conversion section 363. In the baseband section 361, one or more baseband signals, e.g., quadrature data signals, are converted from analog to digital signals and filtered in a low pass manner. The resulting signals are modulated, e.g., quadrature modulated, in the IF section 362 and filtered in a bandpass manner. This signal is then up-converted in frequency, filtered in a bandpass manner and amplified or attenuated as necessary in the frequency up-conversion section 363.

As noted above, the receiver 30 includes a receiver section 34 and a transmitter section 36. One example of such a tester 30 has been designed for analyzing complex signals generated in IEEE 802.11a/b/g systems. The receiver section operates as a vector signal analyzer, while the transmitter operates as a vector signal generator. The vector signal analyzer is used to perform data capture on analog (RF or baseband) signals and perform a number of different analyses of the captured data for verifying the transmitter performance of the DUT 50. The vector signal generator is used to generate complex signals for verification of the receiver portion of the DUT 50. In addition to the following discussion, more detailed information on such a tester can be found in Appendix A, the contents and disclosure of which are incorporated herein by reference.

Figure 4:
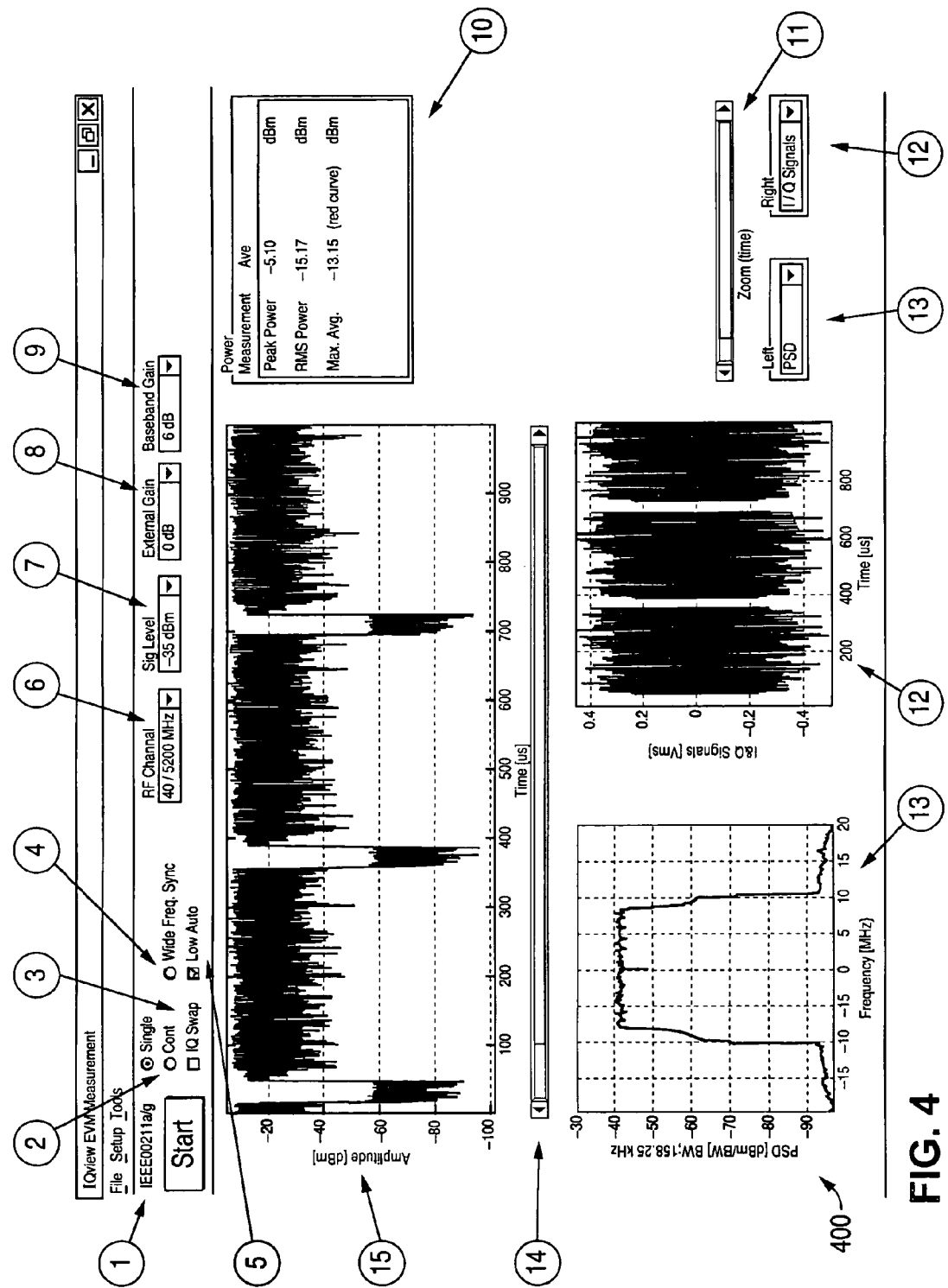
FIG. 4 is an example of a computer display generated for viewing various characteristics of the signal being tested in accordance with one embodiment of the presently claimed invention.

Referring to FIG. 4, one example of a computer display 400 provides information following data capture by the receiver 34 and data analysis by the computer. The start button 1 allows the user to initiate single or continuous data capture and analysis, and is identified by the single/continuous mode indicator 2. An IQ swap indicator 3 identifies when the quadrature channel data is reversed. A wide frequency synchronization indicator 4 identifies when data analysis with a wider than normal frequency error is enabled. An auto level indicator identifies when automatic gain control is enabled. Additional indicators identify the input RF channel 6, the input signal level 7, external gain 8 and baseband gain 9.

A window 10 provides measurement results, such as peak, root mean square (RMS) and maximum average power. A zoom slider 11 allows the user to zoom in on the captured data to analyze it and show it within the top graph window 15. A graph selector 12 allows the user to select the type of graph shown in the right graph window. Another selector 13 allows the user to select the type of graph shown in the left graph window. A time slider 14 allows the user to move the visible portion of the data in the top graph 15 to the left or right. The top graph window 15 illustrates a graphical representation of the measured data, and can illustrate various signal characteristics such as peak amplitude value as well as a moving average.

Figure 5:
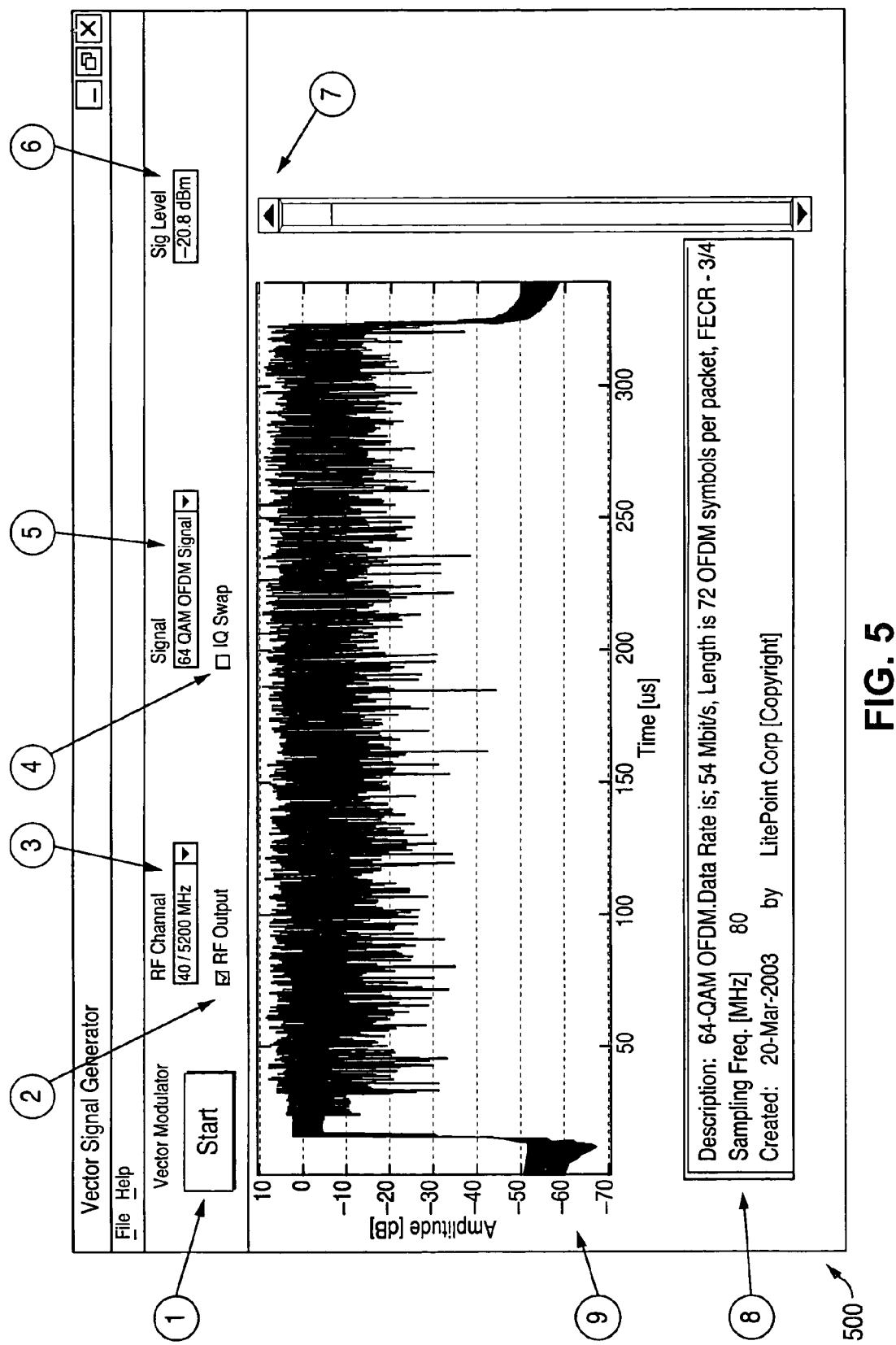
FIG. 5 is an example of a computer display of a control window for a user to establish and control a test signal to be generated by the transmitter section of the tester.

Referring to FIG. 5, a computer display 500 illustrating how the user may instruct and control the signal data to be downloaded to the transmitter 36 is shown. The start button 1 is used to start and stop the vector signal generator operation. The RF output selector 2 allows the user to select the output mode of the baseband and RF ports of the transmitter 36. The RF channel selector 3 controls the RF output channel. An IQ swap selector 4 allows the user to reverse the quadrature signals. A signal selector 5 allows the user to select the type of signal modulation. A signal level indicator 6 displays the current output RMS signal level. A signal level slider 7 is used to set the output signal level. An information window 8 displays textual information about the signal being generated. A window 9 shows a graphical representation of the output signal to be generated.

Various other modifications and alternations in the structure and method of operation of this invention will be apparent to those skilled in the art without departing from the scope and the spirit of the invention. Although the invention has been described in connection with, specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a distributed test equipment system for testing analog communications systems, comprising:
   a packet-switched network interface including a first server connection node and a first client connection node for relaying a first plurality of packetized test commands and a first plurality of packetized signal data;
   a first analog signal receiver responsive to a first analog signal received from a first external signal source by measuring said first analog signal and generating a first plurality of measurement data representing said first analog signal;
   a first server coupled to said first server connection node and said first analog signal receiver, and responsive to said first plurality of packetized test commands by packetizing and transmitting, via said first server connection node, said first plurality of measurement data as said first plurality of packetized signal data; and
   a first client computer including a first user interface, coupled to said first client connection node, responsive to a first plurality of user commands received via said first user interface by generating and transmitting said first plurality of packetized test commands, and further responsive to said first plurality of user commands and said first plurality of measurement data by processing said first plurality of measurement data to produce a first plurality of processed signal data representing a first plurality of characteristics of said first analog signal.

2. The apparatus of claim 1, wherein said packet-switched network interface comprises an interface for Transmission Control Protocol/Internet Protocol (TCP/IP) communication.

3. The apparatus of claim 1, wherein said first analog signal receiver comprises a radio frequency (RF) signal receiver which is responsive to a first RF signal as said analog signal by sampling said first RF signal at a plurality of selected time intervals to produce a first plurality of sampled RF signal data as said first plurality of measurement data.

4. The apparatus of claim 1, wherein said first server comprises a personal computer.

5. An apparatus including a distributed test equipment system for testing analog communications systems, comprising:
   a packet-switched network interface including a first server connection node and a first client connection node for relaying a first plurality of packetized test commands and a first plurality of packetized signal data;
   a first analog signal receiver responsive to a first analog signal received from a first external signal source by measuring said first analog signal and generating a first plurality of measurement data representing said first analog signal;
   a first server coupled to said first server connection node and said first analog signal receiver, and responsive to said first plurality of packetized test commands by packetizing and transmitting, via said first server connection node, said first plurality of measurement data as said first plurality of packetized signal data; and a first client computer including a first user interface, coupled to said first client connection node, responsive to a first plurality of user commands received via said first user interface by generating and transmitting said first plurality of packetized test commands, and further responsive to said first plurality of user commands and said first plurality of measurement data by processing said first plurality of measurement data to produce a first plurality of processed signal data representing a first plurality of characteristics of said first analog signal, wherein:

said packet-switched network interface is further for relaying a second plurality of packetized test commands;

said first server is further responsive to said second plurality of packetized test commands by providing a plurality of signal transmission data;

said apparatus further comprises an analog signal transmitter coupled to said first server and responsive to said plurality of signal transmission data by generating a corresponding second analog signal; and said first client computer is further responsive to a second plurality of user commands received via said first user interface by generating and transmitting said second plurality of packetized test commands.

6. An apparatus including a distributed test equipment system for testing analog communications systems, comprising:

a packet-switched network interface including a first server connection node and a first client connection node for relaying a first plurality of packetized test commands and a first plurality of packetized signal data;

a first analog signal receiver responsive to a first analog signal received from a first external signal source by measuring said first analog signal and generating a first plurality of measurement data representing said first analog signal;

a first server coupled to said first server connection node and said first analog signal receiver, and responsive to said first plurality of packetized test commands by packetizing and transmitting, via said first server connection node, said first plurality of measurement data as said first plurality of packetized signal data; and a first client computer including a first user interface, coupled to said first client connection node, responsive to a first plurality of user commands received via said first user interface by generating and transmitting said first plurality of packetized test commands, and further responsive to said first plurality of user commands and said first plurality of measurement data by processing said first plurality of measurement data to produce a first plurality of processed signal data representing a first plurality of characteristics of said first analog signal, wherein:

said packet-switched network interface further includes a second client connection node and is further for relaying a second plurality of packetized test commands;

said first server is further responsive to said second plurality of packetized test commands by providing a plurality of signal transmission data; and said apparatus further comprises an analog signal transmitter coupled to said first server and responsive to said plurality of signal transmission data by generating a corresponding second analog signal, and a second client computer, including a second user interface, coupled to said second client connection node, responsive to a second plurality of user commands received via said second user interface by generating and transmitting said second plurality of packetized test commands.

7. An apparatus including a distributed test equipment system for testing analog communications systems, comprising:

a packet-switched network interface including a first server connection node and a first client connection node for relaying a first plurality of packetized test commands and a first plurality of packetized signal data;

a first analog signal receiver responsive to a first analog signal received from a first external signal source by measuring said first analog signal and generating a first plurality of measurement data representing said first analog signal;

a first server coupled to said first server connection node and said first analog signal receiver, and responsive to said first plurality of packetized test commands by packetizing and transmitting, via said first server connection node, said first plurality of measurement data as said first plurality of packetized signal data; and a first client computer including a first user interface, coupled to said first client connection node, responsive to a first plurality of user commands received via said first user interface by generating and transmitting said first plurality of packetized test commands, and further responsive to said first plurality of user commands and said first plurality of measurement data by processing said first plurality of measurement data to produce a first plurality of processed signal data representing a first plurality of characteristics of said first analog signal, wherein:

said packet-switched network interface further includes a second client connection node and is further for relaying a second plurality of packetized test commands and a second plurality of packetized signal data;

said first analog signal receiver is further responsive to said first analog signal received from said first external signal source by measuring said first analog signal and generating a second plurality of measurement data representing said first analog signal;

said first server is further responsive to said second plurality of packetized test commands by packetizing and transmitting, via said first server connection node, said second plurality of measurement data as said second plurality of packetized signal data; and said apparatus further comprises a second client computer, including a second user interface, coupled to said second client connection node, responsive to a second plurality of user commands received via said second user interface by generating and transmitting said second plurality of packetized test commands, and further responsive to said second plurality of user commands and said second plurality of measurement data by processing said second plurality of measurement data to produce a second plurality of processed signal data representing a second plurality of characteristics of said first analog signal.

8. An apparatus including a distributed test equipment system for testing analog communications systems, comprising:

a packet-switched network interface including a first server connection node and a first client connection node for relaying a first plurality of packetized test commands and a first plurality of packetized signal data;

a first analog signal receiver responsive to a first analog signal received from a first external signal source by measuring said first analog signal and generating a first plurality of measurement data representing said first analog signal;

a first server coupled to said first server connection node and said first analog signal receiver, and responsive to said first plurality of packetized test commands by packetizing and transmitting, via said first server connection node, said first plurality of measurement data as said first plurality of packetized signal data; and a first client computer including a first user interface, coupled to said first client connection node, responsive to a first plurality of user commands received via said first user interface by generating and transmitting said first plurality of packetized test commands, and further responsive to said first plurality of user commands and said first plurality of measurement data by processing said first plurality of measurement data to produce a first plurality of processed signal data representing a first plurality of characteristics of said first analog signal, wherein:

said packet-switched network interface further includes a second client connection node and is further for relaying a second plurality of packetized test commands and a second plurality of packetized signal data;

said apparatus further comprises a second analog signal receiver responsive to a second analog signal received from a second external signal source by measuring said second analog signal and generating a second plurality of measurement data representing said second analog signal, and a second server coupled to said second server connection node and said second analog signal receiver, and responsive to said second plurality of packetized test commands by packetizing and transmitting, via said second server connection node, said second plurality of measurement data as said second plurality of packetized signal data; and said first client computer is further responsive to a second plurality of user commands received via said first user interface by generating and transmitting said second plurality of packetized test commands, and further responsive to said second plurality of user commands and said second plurality of measurement data by processing said second plurality of measurement data to produce a second plurality of processed signal data representing a second plurality of characteristics of said second analog signal.

9. An apparatus including a distributed test equipment system for testing analog communications systems, comprising:

packet-switched network means for relaying a first plurality of packetized test commands and a first plurality of packetized signal data;

first analog signal receiver means for measuring a first analog signal received from a first external signal source and generating a first plurality of measurement data representing said first analog signal;

first server means for receiving said first plurality of packetized test commands and in response thereto packetizing and transmitting said first plurality of measurement data as said first plurality of packetized signal data; and first client computer means for receiving a first plurality of user commands via a first user interface and in response thereto generating and transmitting said first plurality of packetized test commands, and processing said first plurality of measurement data to produce a first plurality of processed signal data representing a first plurality of characteristics of said first analog signal, wherein:

said packet-switched network means is further for relaying a second plurality of packetized test commands;

said first server means is further for receiving said second plurality of packetized test commands and in response thereto generating a plurality of signal transmission data;

said apparatus further comprises analog signal transmitter means for receiving said plurality of signal transmission data and in response thereto generating a corresponding second analog signal; and said first client computer means is further for receiving a second plurality of user commands via said first user interface and in response thereto generating and transmitting said second plurality of packetized test commands.

10. An apparatus including a distributed test equipment system for testing analog communications systems, comprising:

packet-switched network means for relaying a first plurality of packetized test commands and a first plurality of packetized signal data;

first analog signal receiver means for measuring a first analog signal received from a first external signal source and generating a first plurality of measurement data representing said first analog signal;

first server means for receiving said first plurality of packetized test commands and in response thereto packetizing and transmitting said first plurality of measurement data as said first plurality of packetized signal data; and first client computer means for receiving a first plurality of user commands via a first user interface and in response thereto generating and transmitting said first plurality of packetized test commands, and processing said first plurality of measurement data to produce a first plurality of processed signal data representing a first plurality of characteristics of said first analog signal, wherein:

said packet-switched network means is further for relaying a second plurality of packetized test commands;

said first server means is further for receiving said second plurality of packetized test commands and in response thereto generating a plurality of signal transmission data; and said apparatus further comprises analog signal transmitter means for receiving said plurality of signal transmission data and in response thereto generating a corresponding second analog signal, and second client computer means for receiving a second plurality of user commands via a second user interface and in response thereto generating and transmitting said second plurality of packetized test commands.

11. An apparatus including a distributed test equipment system for testing analog communications systems, comprising:

packet-switched network means for relaying a first plurality of packetized test commands and a first plurality of packetized signal data;

first analog signal receiver means for measuring a first analog signal received from a first external signal source and generating a first plurality of measurement data representing said first analog signal;

first server means for receiving said first plurality of packetized test commands and in response thereto packetizing and transmitting said first plurality of measurement data as said first plurality of packetized signal data; and first client computer means for receiving a first plurality of user commands via a first user interface and in response thereto generating and transmitting said first plurality of packetized test commands, and processing said first plurality of measurement data to produce a first plurality of processed signal data representing a first plurality of characteristics of said first analog signal, wherein:

said packet-switched network means is further for relaying a second plurality of packetized test commands and a second plurality of packetized signal data;

said first analog signal receiver means is further for measuring said first analog signal and generating a second plurality of measurement data representing said first analog signal;

said first server means is further for receiving said second plurality of packetized test commands and in response thereto packetizing and transmitting said second plurality of measurement data as said second plurality of packetized signal data; and said apparatus further comprises second client computer means for receiving a second plurality of user commands via a second user interface and in response thereto generating and transmitting said second plurality of packetized test commands, and for processing said second plurality of measurement data to produce a second plurality of processed signal data representing a second plurality of characteristics of said first analog signal.

12. An apparatus including a distributed test equipment system for testing analog communications systems, comprising:

packet-switched network means for relaying a first plurality of packetized test commands and a first plurality of packetized signal data;

first analog signal receiver means for measuring a first analog signal received from a first external signal source and generating a first plurality of measurement data representing said first analog signal;

first server means for receiving said first plurality of packetized test commands and in response thereto packetizing and transmitting said first plurality of measurement data as said first plurality of packetized signal data; and first client computer means for receiving a first plurality of user commands via a first user interface and in response thereto generating and transmitting said first plurality of packetized test commands, and processing said first plurality of measurement data to produce a first plurality of processed signal data representing a first plurality of characteristics of said first analog signal, wherein:

said packet-switched network means is further for relaying a second plurality of packetized test commands and a second plurality of packetized signal data;

said apparatus further comprises second analog signal receiver means for measuring a second analog signal received from a second external signal source and generating a second plurality of measurement data representing said second analog signal, and second server means for receiving said second plurality of packetized test commands and in response thereto packetizing and transmitting said second plurality of measurement data as said second plurality of packetized signal data; and said first client computer means is further for receiving a second plurality of user commands via said first user interface and in response thereto generating and transmitting said second plurality of packetized test commands, and for processing said second plurality of measurement data to produce a second plurality of processed signal data representing a second plurality of characteristics of said second analog signal.

13. A method for testing analog communications systems in a distributed testing environment, comprising:

receiving a first plurality of user commands via a first computer user interface;

generating a first plurality of packetized test commands in response to said first plurality of user commands;

relaying said first plurality of packetized test commands via a packet-switched network;

receiving a first analog signal from a first external signal source;

measuring said first analog signal and generating a first plurality of measurement data representing said first analog signal;

packetizing said first plurality of measurement data as a first plurality of packetized signal data in response to said first plurality of packetized test commands;

relaying said first plurality of packetized signal data via said packet-switched network; and processing said first plurality of measurement data in response to said first plurality of user commands to produce a first plurality of processed signal data representing a first plurality of characteristics of said first analog signal, further comprising:

receiving a second plurality of user commands via said first computer user interface;

generating a second plurality of packetized test commands in response to said second plurality of user commands;

relaying said second plurality of packetized test commands via said packet-switched network;

generating a plurality of signal transmission data in response to said second plurality of packetized test commands; and generating a corresponding second analog signal in response to said plurality of signal transmission data.

14. A method for testing analog communications systems in a distributed testing environment, comprising:

receiving a first plurality of user commands via a first computer user interface;

generating a first plurality of packetized test commands in response to said first plurality of user commands;

relaying said first plurality of packetized test commands via a packet-switched network;

receiving a first analog signal from a first external signal source;

measuring said first analog signal and generating a first plurality of measurement data representing said first analog signal;

packetizing said first plurality of measurement data as a first plurality of packetized signal data in response to said first plurality of packetized test commands;

relaying said first plurality of packetized signal data via said packet-switched network; and processing said first plurality of measurement data in response to said first plurality of user commands to produce a first plurality of processed signal data representing a first plurality of characteristics of said first analog signal, further comprising:

receiving a second plurality of user commands via a second computer user interface;

generating a second plurality of packetized test commands in response to said second plurality of user commands;

relaying said second plurality of packetized test commands via said packet-switched network;

generating a plurality of signal transmission data in response to said second plurality of packetized test commands; and generating a corresponding second analog signal in response to said plurality of signal transmission data.

15. A method for testing analog communications systems in a distributed testing environment, comprising:

receiving a first plurality of user commands via a first computer user interface;

generating a first plurality of packetized test commands in response to said first plurality of user commands;

relaying said first plurality of packetized test commands via a packet-switched network;

receiving a first analog signal from a first external signal source;

measuring said first analog signal and generating a first plurality of measurement data representing said first analog signal;

packetizing said first plurality of measurement data as a first plurality of packetized signal data in response to said first plurality of packetized test commands;

relaying said first plurality of packetized signal data via said packet-switched network; and processing said first plurality of measurement data in response to said first plurality of user commands to produce a first plurality of processed signal data representing a first plurality of characteristics of said first analog signal, further comprising:

receiving a second plurality of user commands via a second computer user interface;

generating a second plurality of packetized test commands in response to said second plurality of user commands;

relaying said second plurality of packetized test commands via said packet-switched network;

measuring said first analog signal and generating a second plurality of measurement data representing said first analog signal;

packetizing said second plurality of measurement data as a second plurality of packetized signal data in response to said second plurality of packetized test commands;

relaying said second plurality of packetized signal data via said packet-switched network; and processing said second plurality of measurement data in response to said second plurality of user commands to produce a second plurality of processed signal data representing a second plurality of characteristics of said first analog signal.

16. A method for testing analog communications systems in a distributed testing environment, comprising:

receiving a first plurality of user commands via a first computer user interface;

generating a first plurality of packetized test commands in response to said first plurality of user commands;

relaying said first plurality of packetized test commands via a packet-switched network;

receiving a first analog signal from a first external signal source;

measuring said first analog signal and generating a first plurality of measurement data representing said first analog signal;

packetizing said first plurality of measurement data as a first plurality of packetized signal data in response to said first plurality of packetized test commands;

relaying said first plurality of packetized signal data via said packet-switched network; and processing said first plurality of measurement data in response to said first plurality of user commands to produce a first plurality of processed signal data representing a first plurality of characteristics of said first analog signal, further comprising:

receiving a second plurality of user commands via said first computer user interface;

generating a second plurality of packetized test commands in response to said second plurality of user commands;

relaying said second plurality of packetized test commands via said packet-switched network;

receiving a second analog signal from a second external signal source;

measuring said second analog signal and generating a second plurality of measurement data representing said second analog signal;

packetizing said second plurality of measurement data as a second plurality of packetized signal data in response to said second plurality of packetized test commands;

relaying said second plurality of packetized signal data via said packet-switched network; and processing said second plurality of measurement data in response to said second plurality of user commands to produce a second plurality of processed signal data representing a second plurality of characteristics of said first analog signal.

\* \* \* \* \*